United States Patent [19]

Parks, Jr.

[11] 4,357,863
[45] Nov. 9, 1982

[54] SETTABLE ORIFICE

[76] Inventor: George W. Parks, Jr., 314 36th St., Snyder, Tex. 79549

[21] Appl. No.: 875,746

[22] Filed: Feb. 6, 1978

[51] Int. Cl.³ .............................. A23K 1/04; A23J 1/06
[52] U.S. Cl. ........................................ 99/483; 99/516; 138/40; 138/44
[58] Field of Search ................. 99/474, 483, 487, 534, 99/536; 138/44–46, 40, 94

[56] References Cited

U.S. PATENT DOCUMENTS

| | | | |
|---|---|---|---|
| 1,610,507 | 12/1926 | Foley | 138/40 |
| 1,892,906 | 1/1933 | Schnitter | 138/44 |
| 2,816,730 | 12/1957 | Rabas | 251/328 |
| 2,965,695 | 12/1960 | Sleicher, Jr. | 138/40 |
| 3,591,132 | 7/1971 | Johnston et al. | 251/328 |
| 3,615,651 | 10/1971 | Parks, Jr. | 426/647 |

Primary Examiner—Philip R. Coe
Assistant Examiner—Timothy F. Simone
Attorney, Agent, or Firm—Wendell Coffee

[57] ABSTRACT

An adjustable orifice in the steam supply line to a gelatinizer has a pair of facing flanges. An orifice plate between the flanges is adjusted with the orifice offset to the bore through the flanges so that the proper amount of steam is supplied to the gelatinizer. After proper adjustment, the plate is clamped in place and all portions of the plate extending beyond the flanges are cut off to prevent the flow rate from being changed by unauthorized personnel.

4 Claims, 5 Drawing Figures

SETTABLE ORIFICE

BACKGROUND OF THE INVENTION (1) Field of the Invention

This invention relates to regulating fluid flows and more particularly to setting a proper steam flow for slaughterhouse equipment.

(2) Description of the Prior Art

My prior U.S. Pat. No. 3,615,651 discloses a gelatinizer for slaughterhouses having a steam flow thereto.

BERMAN ET AL., U.S. Pat. No. 3,936,031, discloses an aspirator having an orifice plate between two flanges. There are two sets of seals whereby the plate may be in either of an open position or a closed position. There appears to be no disclosure of the plate in any position except either an open position or a closed position.

Other workers in the art have shown aligned bores with a slide having orifices therein wherein the slide can be moved back and forth to either align the orifice with the bores or move it away so that either a flow or no flow is permitted. E.g., ABBEY U.S. Pat. No. 2,828,146, BERMAN ET AL. U.S. Pat. No. 3,936,031. Other shut-off valves operate in a similar fashion but have actuating panels thereon. E.g., RABAS U.S. Pat. No. 2,816,730, COVER U.S. Pat. No. 2,913,220, LE ROUX U.S. Pat. No. 2,986,367.

Also before this application was filed applicant was aware of JOHNSTON U.S. Pat. No. 3,591,132 and CLARKSON U.S. Pat. No. 4,007,911.

In my previous patent as described above, I have disclosed a process wherein blood is gelatinized by the application of steam to a gelatinizer. This flow of steam may be accurately set by trained personnel at the time of installation of the equipment. Thereafter often untrained workmen believe that they can improve upon the process by changing the rate of flow of steam and, therefore, change the settings of the valves. This usually results in malfunctioning of the equipment.

SUMMARY OF THE INVENTION (1) New and Different Function

I have found the solution to the problem of untrained personnel changing the setting of valves once they are properly set by trained personnel. Specifically, an orifice plate slide is placed between two facing flanges. The orifice plate is adjusted until the correct fluid flow is obtained. Then the plate is tightly clamped between the two flanges and the excess portion of the plate is removed so that it appears to untrained personnel that it is no longer adjustable.

Thus, I have solved the problem with simple equipment which is easily and inexpensively manufactured. In sum, I have achieved the results which is far greater than the sum of the individual functions of the plates, bolts, flanges, etc. that go to make up the equipment.

(2) Objects of this Invention

An object of this invention is to control the flow of fluid through a pipeline.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

DETAILED DESCRIPTION OF THE PREFERRED EMBODIMENT

Figure 1:
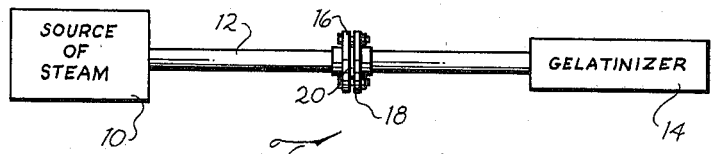
FIG. 1 is a schematic representation of the location of the equipment used in connection with this settable orifice.

Referring particularly to FIG. 1 of the drawing, there may be seen a representation of a source of steam 10 connected by pipeline 12 to gelatinizer 14. The device according to this invention is represented by the two flanges 16 and 18 with the plate 20 therebetween.

Figure 2:
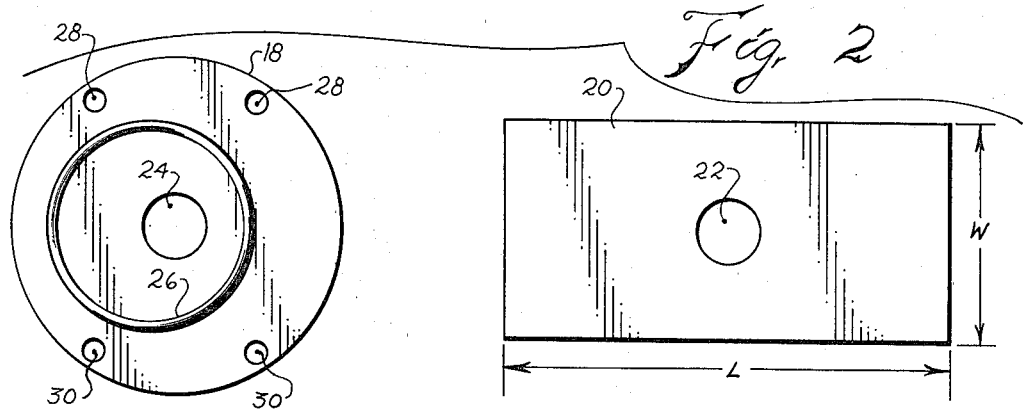
FIG. 2 is a plan view of one of the flanges with said slide.

Referring more particularly to FIG. 2 there may be seen the flange 18 with the plate 20 in the uncut position. It may be seen that the plate 20 has orifice 22 in the form of a circular apperature therethrough. Also it may be seen that the plate 20 has a width W and a length L and that the length is greater than the width.

Figure 3:
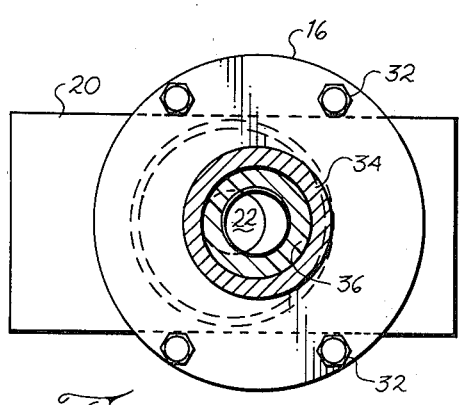
FIG. 3 is a plan view of the assembled equipment taken substantially on line 3—3 of FIG. 5.

Still referring to FIG. 2, the flange 18 has a bore which is cylindrical bore 24. The bore is surrounded by a seal in the form of O-ring 26. It may be seen that the O-ring is circular, i.e., in FIG. 2 it appears as a circle and this circle is eccentric to the bore 24. I.e., the bore has an axis and the seal has an axis and these axes are offset to one another. As appears in FIG. 2 the offset of the axes is aligned with the length of the plate 20 or the length is aligned with the offset of the axes of the seal 26 and the bore 24. Also it may be seen that the flange is provided with four holes, two of which are designated as 28 and two as 30. The distance between the holes 28 and 30 are greater than the width W of the plate 20. Therefore, as seen in FIG. 3, the parts may be assembled with the plate 20 located between the bolt holes 28 and 30. Also it may be seen that in the assembled parts, the axis of the orifice 22 is offset from the axis of the bore 24, however, it is aligned lengthwise with the plate, i.e., the plate is aligned with the axes of the bore 24 and the seal 26. One of the bolts 32 is through each of the bolt holes.

Figure 5:
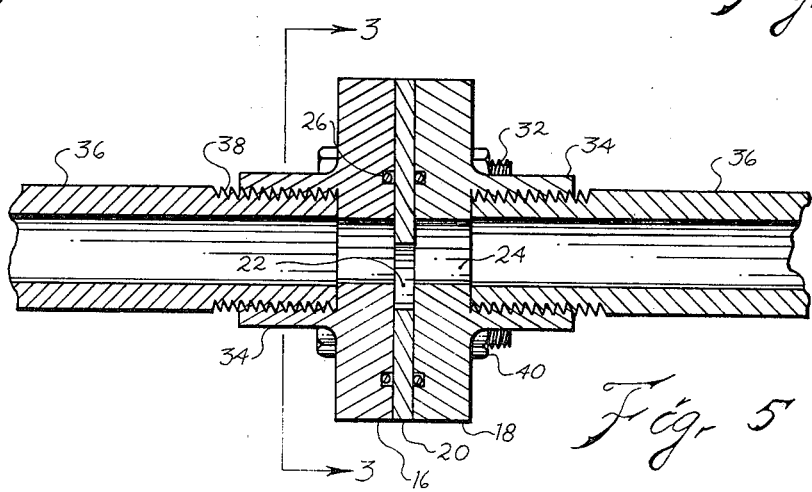
FIG. 5 is a side elevational view taken substantially on line 5—5 of FIG. 4.

Referring to FIG. 5 it may be seen that each of the flanges 16 and 18 have nipple 34 which has a means for connecting it within the pipe 36 forming the pipeline 12. There are means in the form of threads 38 for connecting the pipes 36 to the flanges. Nuts 40 on the bolts 32 form means for tightly clamping the plate 20 between the flanges 16 and 18.

The O-ring seal 26 is placed within grooves in the face of the flanges as is customary and well known. The drawings show the O-ring seal 26 to be three times the diameter of the orifice 22. Analysis indicates that the seal must be over twice the diameter of the orifice.

The installation and setting of the orifice is as follows. First, the device or fitting with the flanges 16 and 18 are assembled onto the pipes 36 and the pipeline 12 connected between the source of steam 10 and the gelatinizer 14. The orifice plate 20 is placed between the flanges 16 and 18 and the bolts 32 are placed in the bolt holes 28 and 30. The plate 20 will extend between the bolt holes 28 and the bolt holes 30. The plate is moved back and forth until the proper opening is provided. During the initial operation of the gelatinizer this adjustment may be changed until the proper adjustment is found by the trained personnel at the time of the initial operation of the gelatinizer. After the proper position is found, the nuts 40 are tightly clamped on the bolts 32 holding the plate 20 tightly in place. Then the excess of the plate 20 projecting beyond the flanges 16 and 18 are cut away, as for example using an acetylene torch.

Figure 4:
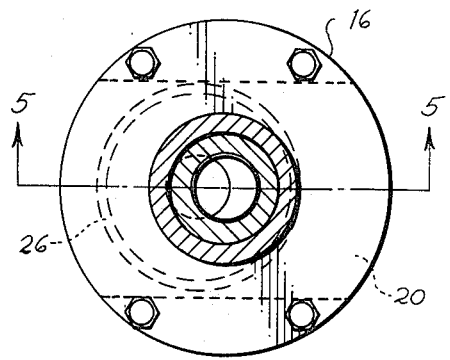
FIG. 4 is similar to FIG. 2 showing the slide cut off.

After being cut away, the device will have the appearance as shown in FIG. 4 with no portion or part of the plate 20 extending beyond the flanges from the fitting. Thus it may be seen the plate is entirely confined within the flanges and the plate is unconnected to any structure outside of the flanges.

Although the adjustment of the orifice may be changed after the excess has been cut away as skilled workmen will recognize by loosening the nuts 40 on the bolts 32 and using a punch to move the plate 20 back and forth, this adjustment is neither apparent or readily available to the operating personnel of the slaughterhouse and, therefore, they will not change it once it has been set.

The flanges face one another and are parallel as the face containing the seals 26 are parallel.

As an aid to correlating the terms of the claims to the exemplary drawing, the following catalog of elements is provided:

| 10 | steam | 28 | bolt holes |
| 12 | pipeline | 30 | bolt holes |
| 14 | gelatinizer | 32 | bolt |
| 16 | flange | 34 | nipples |
| 18 | flange | 36 | pipes |
| 20 | plate | 38 | threads |
| 22 | orifice | 40 | nut |
| 24 | bore | W | width |
| 26 | seal | L | length |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. A device for having a settable opening in a pipeline comprising:
   a. a pair of facing parallel flanges in the pipeline,
   b. bolts holding the flanges together,
   c. a bore in each flange,
   d. the bores aligned with each other,
   e. a plate securely clamped between the flanges by said bolts,
   f. an orifice in the plate,
   g. said orifice offset from said bore, and
   h. said plate entirely confined within said flanges and unconnected to any structure outside said flanges,
   i. a gelatinizer for gelatinizing fresh blood within a slaughter house,
   j. a source of steam under pressure,
   k. said pipeline having said device therein connecting said source of steam to said gelatinizer,
   l. whereby movement of the plate reduces the fluid flow through the pipeline.

2. The invention as defined in claim 1 further comprising:
   n. said plate having a length greater than its width,
   o. said bores having an axis,
   p. said orifice having an axis displaced from the bore axis along the plate length,
   q. a circular seal in the form of a circular O-ring set in a groove in each of the flanges and said seals having single axis,
   r. said seal axis offset from the bore axis along the plate length.

3. The invention as defined in claim 2 further comprising:
   v. said bolts in the flange with the space between at least two of the bolts greater than the width of the plate.

4. The invention as defined in claim 2 further comprising:
   s. said circular seal having a diameter over twice the diameter of the orifice.

* * * * *